July 26, 1955
L. R. WOSIKA
2,713,990
EXHAUST STRUCTURE FOR GAS TURBINE
Filed Dec. 21, 1948
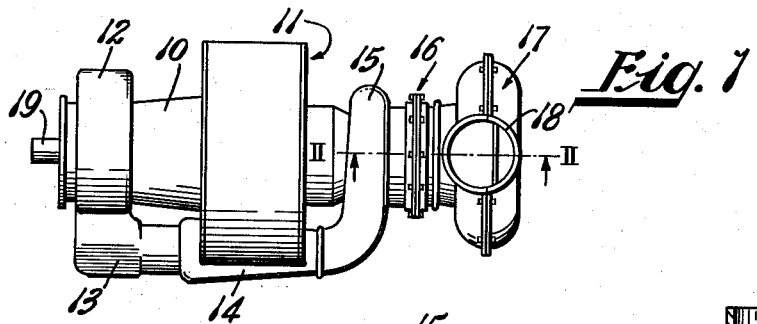
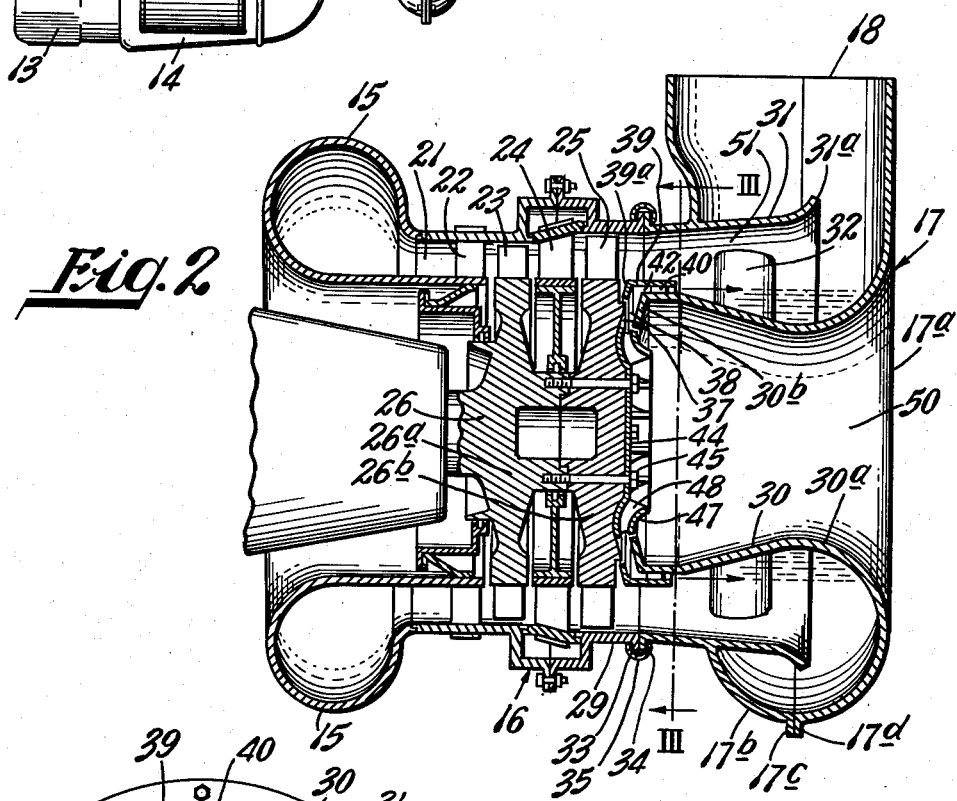
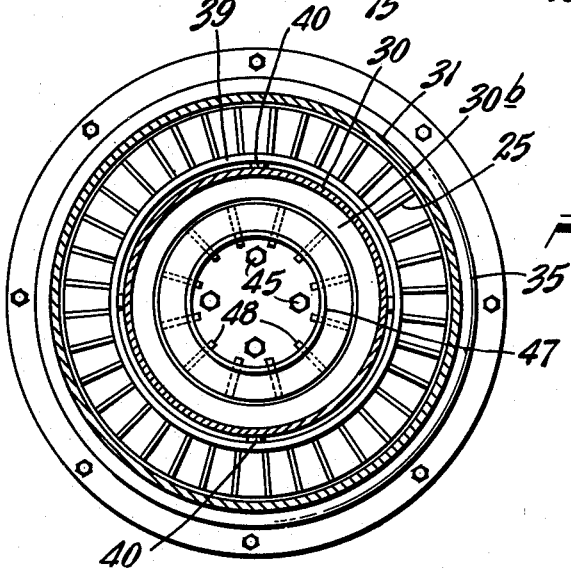
INVENTOR
L. R. WOSIKA
BY
ATTORNEY

United States Patent Office 2,713,990
Patented July 26, 1955

2,713,990

EXHAUST STRUCTURE FOR GAS TURBINE

Leon R. Wosika, San Diego, Calif., assignor to Solar Aircraft Company, San Diego, Calif., a corporation of California Application December 21, 1948, Serial No. 66,532

5 Claims. (Cl. 253—69)

This invention relates to gas turbines of the type in which hot products of combustion are directed axially through turbine blades mounted on the periphery of a turbine rotor.

An object of the invention is to provide, for conducting the exhaust gas from a gas turbine, a structure that does not impose excessive back pressure and yet is compact.

Another object is to provide cooling for the rotor of a gas turbine.

A more specific object is to provide a compact structure capable of substantially expanding and correspondingly reducing the velocity, both rotary and axial, of the exhaust gas during its travel from the turbine blades to the point of discharge into the atmosphere whereby back pressure at the turbine blades is reduced.

Another specific object is to neutralize the tendency of the exhaust gas in an annular exhaust duct aft of the turbine blades to crowd outwardly against the outer wall of the annular duct and cause the exhaust gas to distribute itself more uniformly over the entire cross section of the annular duct.

Other more specific objects and features of the invention will appear from the description to follow.

In a conventional gas turbine of the axial flow type, the exhaust gases leave the turbine with some peripheral or rotary velocity which may be in the vicinity of 200 feet per second. This rotary velocity component tends to urge the gases outwardly and if they are confined in an annular exhaust passage they tend to crowd to the outer wall of the passage causing stratification, tending to keep the effective volume of the exhaust gas approximately constant instead of expanding into a stream of larger cross sectional area with corresponding lower velocity and higher pressure. A large reduction in velocity and corresponding increase in pressure at the point of exhaust into the atmosphere is desirable because it produces a lower back pressure in the turbine itself, just as the efficiency of a water turbine is increased by an effective draft tube.

A contributing reason for the exhaust gases crowding into the outer portion of an annular exhaust duct after leaving the turbine blades is that low velocity eddies and swirls are formed within the exhaust passage adjacent the inner wall thereof and function to effectively restrict the useful area of the duct for gas conduction.

In accordance with the present invention, the tendency of the exhaust to concentrate in the outer portion of the exhaust duct is reduced by directing an auxiliary stream of gas at higher velocity along the inner surface of the exhaust duct. It is convenient to provide a stream of air for this purpose by means of an auxiliary blower mounted on the rear end of the turbine rotor, which blower inducts air from the space within the annular exhaust duct and directs it into an auxiliary passage provided for that purpose in the exhaust duct adjacent the inner wall thereof.

The air is preferably delivered along the inner surface of the exhaust duct at a speed or velocity greater than the axial velocity of the exhaust gas. Thus if the exhaust gas has an axial velocity of approximately 650 feet per second, the auxiliary air may be delivered at an approximate speed of 750 feet per second. The high speed annular air stream forms or constitutes a high energy boundary layer along the inner wall of the annular wall of the exhaust duct tending to aspirate gas from the main exhaust stream and thereby produce an equal pressure gradient across the entire passage. If, as is usually the case, the annular exhaust passage is of expanding cross section in downstream direction, its effectiveness in reducing back pressure on the turbine is greatly increased.

An important advantage of the present invention is that it enables the reduction in velocity and corresponding increase in the pressure of an annular gas stream having a rotary velocity component to be achieved in a shorter space. This advantage is not limited to gas turbines but is also applicable to certain blower uses where requirements call for a large size hub and it is desired to change a high velocity low pressure stream to a low velocity higher pressure stream in a short distance.

In the drawing:

Fig. 1 is a plan view of a gas turbine provided with an exhaust structure in accordance with the invention;

Fig. 2 is a vertical longitudinal section taken in the plane II—II of Fig. 1; and Fig. 3 is a transverse section taken in the plane III—III of Fig. 2.

Referring to Fig. 1 there is shown a simple gas turbine of axial flow type comprising an air compressor 10 which receives air at one end as indicated by the arrow 11, compresses it, and delivers it through a scroll 12, and a pipe 13 to a combustion chamber 14 where it is mixed with a suitable fuel and burned, the products of combustion being delivered to a gas turbine through a scroll 15. The gas turbine portion of the structure as shown in Fig. 1 is indicated generally at 16. After passing through the gas turbine the gases are collected by a collector ring 17 and delivered to an exhaust orifice 18. Both the air compressor 10 and the turbine 16 contain rotors mounted on a common shaft 19 which is seen projecting from the left end of the assembly in Fig. 1.

Referring now to Fig. 2, the hot gases are delivered by the scroll 15 to an annular passage 21 containing a set of stator blades 22 which direct the gas at a suitable angle, that is with a suitable rotary component, against a first set of turbine blades 23 on a turbine rotor 26. After leaving the turbine blades 23, the gases are redirected by a second set of stator blades 24, being permitted to expand to a certain extent, against a second set of rotor blades 25 which are also mounted on the rotor 26. The structure so far described does not constitute a part of the present invention, the latter having to do with the structure for handling the exhaust gases after they leave the last set of rotor blades 25.

There is secured to the rear end of the casing 29 of the turbine an annular duct structure comprising an inner annular wall 30 and an outer annular wall 31. These walls may be interconnected by vanes 32 lying substantially in axial planes, the function of which will be explained later. As shown in Fig. 2, the rear end of the turbine casing 29 may be provided with a flange 33 and the forward end of the outer annular wall 31 may be provided with a flange 34 and the parts can be united by an annular clamp 35 that engages and clamps together the two flanges 33 and 34.

The outer wall 31 flares outwardly in downstream direction and terminates in a bell end 31a. On the other hand, the inner wall 30 is of progressively smaller radius in downstream direction to a point 30a approximately in the transverse plane of the bell end 31a of the outer wall 31 at which point it merges into, (being preferably formed integrally with) one section 17a of the collector ring 17. The rest of this collector ring 17 may be constituted by a section 17b formed integrally with the outer annular wall 31. The sections 17a and 17b may be provided with flanges 17c and 17d at their juxtaposed edges, which anges may be bolted together.

At its upstream end, the inner annular wall 30 is deflected radially inwardly toward the axis of the turbine to form an inwardly extending lip 30b which is spaced a short distance back of a juxtaposed annular face 37 on the turbine rotor 26 to define therewith an annular passage 38 that extends radially outwardly and slightly downstream. Surrounding and slightly spaced from the forward end of the inner wall 30 is an auxiliary annular wall 39 which is supported at circumferential intervals from the wall 30 by vanes 40. The forward end of the annular wall 39 is deflected radially inwardly to form a lip 39a, the edge of which is closely spaced with respect to the adjacent portion of the turbine rotor 26. This auxiliary wall 39 defines with the inner wall 30 a passage 42 that is substantially continuous with the passage 38 and through which air is discharged from a blower structure mounted on the rear end of the turbine rotor 26.

This blower structure comprises an inner wall member 44 that lies against the rear surface of the turbine rotor 26 and is secured thereto by the same bolts 45 that secure the two sections 26a and 26b of the rotor 26 together. The blower is completed by an outer wall 47 that is joined to the inner wall 44 by vanes 48. During rapid rotation of the turbine rotor 26, the blower structure described functions as a conventional centrifugal blower to induct air from the space 50 within the inner annular wall 30 and project it at high velocity through the passages 38 and 42 into the annular passage 51 defined between the inner and outer walls 30 and 31 respectively. It will be observed that since the passage 42 is defined on the outer side by the inner wall 30, the high velocity air stream is discharged along the surface of the inner wall 30. As previously indicated, the velocity of the annular air stream discharged along the inner surface of the annular wall 30 is greater than the velocity of the exhaust gas discharged into the passage 51 from the turbine. Hence this annular air stream constitutes a high energy boundary layer along the surface of the inner wall 30 tending to aspirate gas from the main stream in the passage 51 and reducing the tendency of that gas to remain near the outer surface. The expansion of the gas away from the outer wall 31 toward the inner wall 30 reduces its axial velocity. The vanes 32 eliminate most of the rotary velocity component of the gas by the time it discharges past the lip or end 31a of the outer wall 31, into the collector ring 17.

The air inducted by the blower on the rear end of the turbine rotor 26 performs the additional desirable function of abstracting considerable heat from the rotor thereby helping to maintain its temperature within a desired low range.

Although for the purpose of explaining the invention, a particular embodiment thereof has been shown and described, obvious modifications will occur to a person skilled in the art, and I do not desire to be limited to the exact details shown and described.

I claim:

1. An exhaust structure for an axial flow gas turbine, compressor or the like from which gases are discharged at high velocity and low pressure comprising an exhaust duct defining a passage of progressively increasing area toward the discharge end and having an initial substantially axially extending portion, an annular buffer pocket surrounding the discharge end of said axially extending portion adapted to receive the exhaust gases and dampen the remaining swirl component in said gases to thereby impart a cushioned and muffled redirectional flow to said gases, and a discharge port communicating with said annular buffer pocket at a substantial angle to said initial axially extending portion for directing said exhaust gases into the atmosphere; an air injection passage within said duct adapted to inject air into the center of said duct at a velocity substantially greater than the velocity of said exhaust gases and in the direction of flow of said exhaust gases to aspirate said exhaust gases inwardly and expand said exhaust gases to fill the exhaust duct, reduce the velocity of said exhaust gases, and increase the pressure of said exhaust whereby the effective back pressure is decreased and objectionable stratification of the exhaust gases is obviated.

2. An exhaust structure for an axial flow gas turbine, compressor or the like from which gases are discharged at high velocity and low pressure comprising an exhaust duct defining a passage of progressively increasing area toward the discharge end and having concentric, oppositely sloping, nested, annular walls radially spaced apart to provide a ring-like passage of progressively increasing cross-sectional area in the direction of flow of said exhaust gases; an air injection passage within said duct disposed on the inner wall at the entry end of said passage adapted to inject air into the center of said duct at a velocity substantially greater than the velocity of said exhaust gases and in the direction of flow of said exhaust gases to aspirate said exhaust gases inwardly and expand said exhaust gases to fill the exhaust duct, reduce the velocity of said exhaust gases, and increase the pressure of said exhaust whereby the effective back pressure is decreased and objectionable stratification of the exhaust gases is obviated.

3. The combination defined in claim 2 wherein said air injection passage comprises an inwardly directed annular flange formed on the entry end of said inner annular wall; an annular portion of the entry end of said inner annular wall; a ring element, substantial L-shaped in cross section, disposed with one leg of the L surrounding and paralleling said annular portion of said inner wall in spaced relation thereto and the other leg of the L paralleling said inwardly directed flange; and angularly spaced vanes extending between said annular wall portion and said ring element to support said ring element in position with respect to said entry end of said inner annular wall.

4. An exhaust structure for an axial flow gas supply machine having a discharge rotor at its discharge end comprising an exhaust duct formed by radially spaced, nested, concentric, diverging, annular walls mounted on the discharge end of said machine to provide a ringlike exhaust passage section of progressively increasing area in the direction of flow of the exhaust gases and a concentric axial passage defined by the inner one of said annular walls; angularly spaced vanes interconnecting said annular walls to secure said walls against relative movement and direct the exhaust gases axially of said passage section; an annular, inwardly directed flange formed on the upstream end of said inner one of said annular walls and sloping in an upstream direction toward the body of the discharge rotor to provide an annular passage between said discharge rotor body and the free end of said annular flange; a ring element, substantially L-shaped in cross-section, fixedly mounted on the upstream end of said inner annular wall with one leg surrounding said upstream end in radially spaced relation to provide an annular discharge nozzle opening into said ringlike exhaust passage along the inner diameter of said ringlike exhaust passage and its other leg paralleling said inwardly directed sloping flange whereby an annular passage is provided having a portion opening into said concentric axial passage and an annular discharge nozzle portion opening into said exhaust passage in the direction of flow of said exhaust gases; and a blower structure mounted on the end face of the body of said discharge rotor within the area defined by said first mentioned portion of said annular passage and adapted, upon operation of said rotor, to draw gases from said concentric axial passage and deliver them through said annular discharge nozzle portion at a velocity substantially higher than the velocity of said exhaust gases whereby said exhaust gases are aspirated inwardly to distribute said exhaust gases throughout the entire area of said ringlike exhaust passage thereby reducing the velocity of said exhaust gases and effecting a resultant pressure increase therein to reduce the effective back pressure and objectionable stratification of said exhaust gases in their passage through said exhaust structure.

5. An exhaust structure for an axial flow gas turbine, compressor or the like comprising an exhaust duct defining an annular passage of progressively increasing area toward the discharge end; a rotor unit at the end remote from the discharge end of said duct supplying exhaust gases to said duct at sub-ambient pressure and appreciable rotational velocity which tends to cause said gases to stratify at the periphery of said duct; air injection means within said duct comprising an annular wall closely surrounding the inner wall of the exhaust duct at said end and a generally radially inwardly directed lip extending from said annular wall toward said rotor and into spaced overlapping relation to the inner wall of said duct to form an injection passage to inject air in the direction of flow of said exhaust gases and along the inner boundary of the annular passage defined by said duct; and a blower for supplying air to said air injection passage at a velocity substantially greater than the velocity of said exhaust gases whereby said air injection passage delivers high velocity air to said duct in the direction of flow of said exhaust gases to aspirate said exhaust gases inwardly and expand said exhaust gases to fill the exhaust duct, reduce the velocity of said exhaust gases, and increase the pressure of said exhaust thereby reducing the effective back pressure and obviating objectionable stratification of the exhaust gases.

References Cited in the file of this patent

UNITED STATES PATENTS

| | | |
|---|---|---|
| 2,364,189 | Buchi | Dec. 5, 1944 |
| 2,401,826 | Halford | June 11, 1946 |
| 2,404,334 | Whittle | July 16, 1946 |
| 2,429,990 | Burgess | Nov. 4, 1947 |
| 2,434,134 | Whittle | Jan. 6, 1948 |
| 2,458,600 | Imbert | Jan. 11, 1949 |
| 2,465,846 | Clegern | Mar. 29, 1949 |
| 2,479,573 | Howard | Aug. 23, 1949 |

FOREIGN PATENTS

| | | |
|---|---|---|
| 213,322 | Switzerland | May 1, 1941 |